INVENTORS
FRANK SOLOMON
ALBERT HIMY

United States Patent Office 3,450,566
Patented June 17, 1969

1

3,450,566
ELECTRODE ASSEMBLY WITH ACCORDION WRAP SEPARATOR
Frank Solomon, Lake Success, N.Y., and Albert Himy, Tustin, Calif., assignors to Yardney International Corp., New York, N.Y., a corporation of New York
Continuation-in-part of application Ser. No. 426,457, Oct. 26, 1964. This application June 14, 1966, Ser. No. 557,485
The portion of the term of the patent subsequent to Sept. 21, 1982, has been disclaimed
Int. Cl. H01m 3/04
U.S. Cl. 136—6          5 Claims This application is a continuation-in-part of co-pending application Ser. No. 426,457 filed Oct. 26, 1964, now Patent No. 3,272,653 which is a division of application Ser. No. 119,867 filed June 27, 1961, now Patent No. 3,207,630.

This invention relates to electrochemical generators or accumulators and, more particularly to an electrode assembly for an electrochemical battery. It has particular application to alkaline batteries and especially to alkaline batteries having negative electrodes whose active materials are zinc or cadmium and positive electrodes whose active materials are more electropositive than zinc or cadimum, e.g. silver.

One of the chief problems encountered in the service of these and other types of batteries is the maintenance of their capacity at high and constant values over repeated cycles of charging and discharging. This capacity is reduced by several factors among which are:

(1) The reduction in the effective surface areas of the electrode caused by the loss in shape of the electrodes and particularly the negative zinc electrode; and (2) The penetration of the separator matertials by metallic bridges or dendrites of active material, e.g. zinc, which grow across the separator materials and short the cell.

To improve the performance of alkaline batteries in this respect, it has been proposed to construct alkaline silver-zinc cells with preshaped electrodes and to wrap one of the electrodes in one or more layers of separator material. These batteries have shown good performance but do, after prolonged cycling, show a loss of capacity.

It has now been found that the loss of effective surface area of an electrode (particularly the zinc electrode) and the consequent loss in capacity of a cell brought about by the cycling of a battery may be significantly reduced by separately wrapping both the preshaped positive electrode and the preshaped negative electrode in the semi-permeable separators. By preshaped is meant that the electrode is formed or shaped before its insertion into the separator material and is not dependent on the separator material for its support. Any of a variety of separators may be used for this purpose including silver cellulosate films, polyvinyl alcohol films, regenerated cellulose films, carboxylated polyethylene films and similar semi-permeable sheet materials.

It is accordingly an object of the present invention to provide an electrode assembly for an electrochemical generator which serves to maintain the capacity of said battery over extended cycling thereof.

It is a further object of the present invention to provide an electrode assembly which reduces the loss of effective electrode surface during prolonged cycling of an electrochemical generator containing the same.

2

It is also an object of the present invention to provide an electrode assembly for an electrochemical generator which reduces the metal penetration of the electrode through the separators.

Other and more detailed objects will be apparent from the following description and the accompanying drawing wherein.

Figure 1:
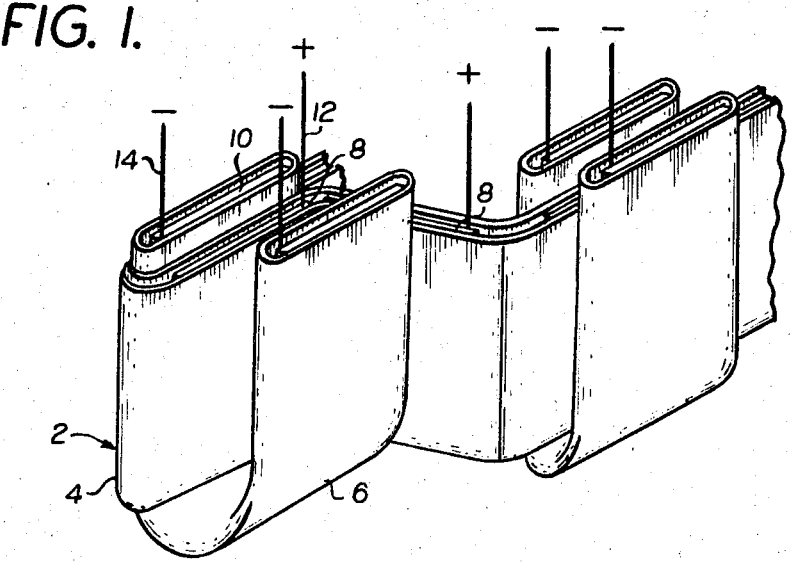
FIG. 1 is a perspective view of an electrode assembly prepared in accordance with the present invention.
Figure 2:
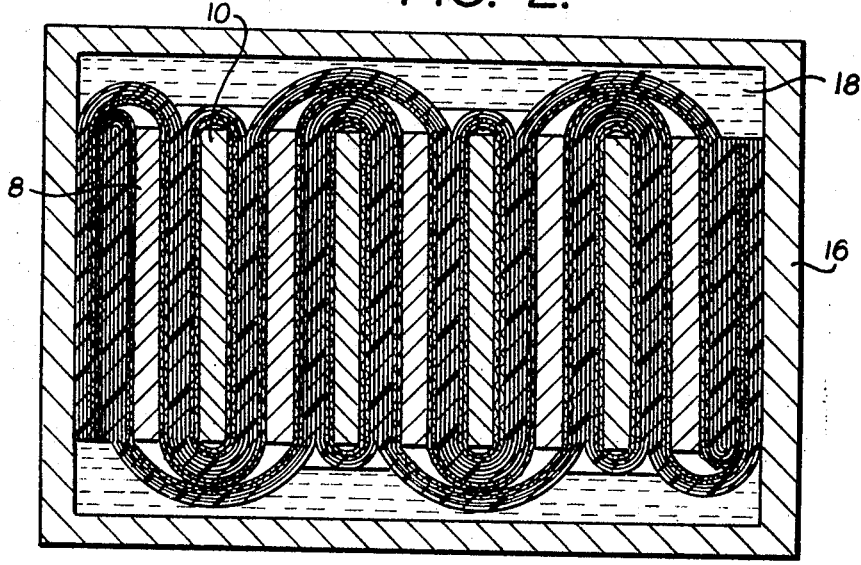
FIG. 2 is a cross-sectional view of the electrode assembly shown in FIG. 1 positioned in a battery casing.

In FIG. 1, an electrode assembly is shown at 2 and comprises an accordion wrap section 4 and a U-wrap section 6. The positive electrodes 8 are contained within the folds of the accordion wrap 4 and a negative electrode 10 is contained within folds of each leg of the U-wrap section 6. Each positive electrode 8 is provided with a lead 12 and each negative plate 10 is provided with a lead 14. The electrode assembly is disposed in a battery casing 16 (FIG. 2) which contains an electrolyte 18.

The present electrode assembly has particular utility in alkaline batteries having silver postive electrodes and zinc negative electrodes. The silver positive electrode is, preferably, a preshaped sintered silver electrode, for example, as prepared in accordance with U.S. Patent No. 2,818,462. The negative zinc electrode is preferably a zinc oxide negative which is prepared by pressing zinc oxide powder on a thin-perforated zinc sheet with or without a binder. The electrolyte is preferably aqueous KOH (44%) although different concentrations and different electrolytes may be employed.

Although these are the preferred electrodes and electrolytes used in accordance with the present invention, it is to be understood that this invention is not limited thereto. It may, for example, be used in connection with silver-cadmium cells, nickel-cadmium cells and the like.

Figure 3:
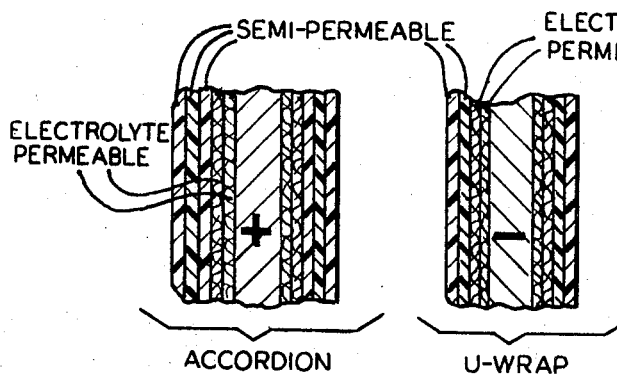
FIG. 3 is a fragmentary sectional view of the assembly of FIG. 1, drawn to a larger scale.

FIG. 3 illustrates one arrangement of separator wraps employed in an assembly embodying the present invention. The accordion wrap 4 is formed by stacking sheets of separator materials in the following order: 2 electrolyte-permeable sheets of woven nylon fabric hereinafter referred to as nylon; 3 semi-permeable sheets of silver cellulosate film sprayed with a sulfonated polystyrene powder suspended in a polystyrene-butadiene latex emulsion hereinafter referred to as "P." The nylon employed may be an hexamethylene diamine/adipic acid copolymer having a molecular weight of more than about 10,000. The nylon woven fabric preferably has a thickness of about 2.2 to 2.3 mils and a weight of about 1 oz. per square yard. The thread count as determined by a comparator is preferably as follows:

End count _____ 98–116
Fill count _____ 108–116

Furthermore, the nylon woven fabric is preferably of 30 denier.

The "P" separator, preferably, has a thickness of about .0013 to .0016 in. and weighs from 2.80 to 3.00 grams per 100 in.$^2$.

A plurality of positive silver electrodes with their leads extending upwardly are arranged so that they are spaced from one another and their upper edges are adjacent the upper edge of the stacked separator sheets. The stack of separator materials is then folded horizontally along the midline so that the lower edge thereof is brought upwardly to enclose the electrodes. The assembly is then folded vertically in alternate directions along lines which run between electrodes, thus forming an accordion-like structure which encloses the positive electrodes.

The U-wrap separator section 6 is made in the following manner:

Two negative zinc plates described above are placed on an electrolyte-permeable sheet of natural cellulose paper, commercially available under the trade name "Aldex," in vertically spaced relationship and on a line which is parallel to one of the edges of said sheet and adjacent said edge. The two plates are then rolled in the paper sheet so that two turns of the paper encompasses the plate. This assembly is then placed on a semi-permeable sheet of silver cellulosate film and rolled in a similar manner so that two turns of the silver cellulosate are wrapped around the plates. The assembly is then folded along a horizontal line between the negative zinc plates, thus forming a U.

The silver cellulosate film preferably has a thickness of about .0010 in. and is prepared by treating cellulose film with a silver salt in aqueous solution.

The manner of assembling the U and accordion sections of the separator arrangement is best shown in FIG. 1 as will be seen, the legs of the U section 6 are interleaved between adjacent sections of the accordion 4 so that a negative electrode is always adjacent a positive electrode. The electrode assembly made in this manner is then inserted in a battery casing 16 and the leads 12 and 14 are attached to the appropriate battery terminals in any suitable fashion. The electrolyte 18 is then added, and the battery is ready for use.

To test the effectiveness of the separate wrapping of the positive and negative electrodes in maintaining the shape of the zinc electrode in a silver-zinc cell as described above, an assembly as illustrated in FIG. 3 was made and performance characteristics determined in comparison with a standard assembly prepared as follows:

The positive electrodes were contained in the arms of a U-wrap consisting of seven layers of separator material. Two layers next to the electrode were electrolyte-permeable material (nylon) followed by three layers of semi-permeable material "P" and finally two layers of silver cellulosate film. The negative plates were wrapped in two electrolyte-permeable layers of "Aldex" paper. This is referred to as the normal wrap. To be able to compare the performance of cells made with electrodes wrapped in this manner with that illustrated in FIG. 3, the same number and types of wrappings were employed for each electrode assembly. Furthermore, the order in which the various layers of wrappings occur between the positive and negative electrodes was maintained. The only difference thus was that in the normal wrap, the negative electrodes were not wrapped in semi-permeable material.

The wrappings between the positive and negative electrodes are as follows: two electrolyte-permeable inside layers of nylon, 3 layers of "P" separator materials, 2 layers of silver cellulosate film, and 2 layers of electrolyte-permeable material.

The electrode assemblies above were used to construct cell packs which were identical in all other respects. Each cell pack consisted of 3 cells and each was wrapped in silver sheet. Each of the packs were tested under the same conditions over approximately 100 cycles and 6½ months charging at 5 amperes to 2.05 volts. The results of the test are given in the following table wherein A is the normal wrap cell and B is the cell of the present invention.

TABLE

| No. of cycles | Capacity, ampere hour | | Percent greater capacity |
|---|---|---|---|
| | A | B | |
| 1 | 170 | 148 | |
| 2 | 164 | 155 | |
| 3 | 156 | 186 | 19 |
| 10 | 109 | 146 | 25 |
| 20 | 100 | 143 | 43 |
| 40 | 87 | 114 | 31 |
| 60 | 78 | 107 | 37 |
| 80 | 69 | 101 | 46 |
| 100 | 63 | 88 | 40 |

As shown in the above table, when the two batteries were compared over a 100 cycles, the embodiment of the present invention, although initially showing less capacity, nevertheless upon continued cycling demonstrated a capability for retaining capacity which over the test period of 100 cycles ranged from 19% to 46% above that demonstrated for the standard wrapped cells.

Examination of the zinc negative electrodes after the test period further revealed that the combination of the accordion and U-wrap resulted in only a 15% zinc shape loss as compared to a 40% loss for the standard wrap.

Numerous modifications and embodiments of this invention can be made without departing from the spirit and scope thereof, it being understood that the invention is not to be limited to specific details of the foregoing disclosure except as defined in the appended claims.

What is claimed is:

1. In an electrochemical battery, an electrode assembly comprising, in combination therewith, a set of first electrodes of one polarity, a set of second electrodes of the opposite polarity interleaved with said first electrodes, first separator means in the form of an accordion wrap having successive folds occupied by said first electrodes, second separator means in the form of a U-wrap having arms individually occupied by said second electrodes, said arms being interleaved between said folds, each of said separator means comprising at least one outermost layer of semi-permeable material.

2. The assembly as defined in claim 1 wherein the first separator means comprises at least three outermost layers of semi-permeable material and the second separator means comprises at least two outermost layers of semi-permeable material.

3. An assembly as defined in claim 1 wherein the electrodes of one of said sets contain silver oxide as their active material and the other of said sets of electrodes contain a metal selected from the group which consists of zinc and cadmium.

4. An assembly as defined in claim 2 wherein the other of said sets of electrodes contain zinc as their active material.

5. The assembly as defined in claim 4 wherein the first separator means comprises at least three outermost layers of semi-permeable material and the second separator means comprises at least two outermost layers of semi-permeable material.

References Cited

UNITED STATES PATENTS

| 2,610,219 | 9/1952 | Yardeny | 136—6 |
| 2,851,509 | 9/1958 | DiPasquale et al. | 136—6 |
| 3,013,099 | 12/1961 | Mendelsohn | 136—146 |
| 3,272,653 | 9/1966 | Solomon et al. | 136—6 |

WINSTON A. DOUGLAS, Primary Examiner.

A. SKAPARS, Assistant Examiner.

U.S. Cl. X.R.

136—30, 83, 147